(12) United States Patent
Zhang et al.

(10) Patent No.: US 12,491,644 B2
(45) Date of Patent: Dec. 9, 2025

(54) CLAMPS

(71) Applicant: BEIJING SOFT ROBOT TECH. CO., LTD., Beijing (CN)

(72) Inventors: Lingfeng Zhang, Suzhou (CN); Lei Bao, Suzhou (CN); Xinghao Mou, Suzhou (CN); Yuanrui Zhao, Suzhou (CN); Zusheng Zhang, Suzhou (CN)

(73) Assignee: BEIJING SOFT ROBOT TECH. CO., LTD., Beijing (CN)

( * ) Notice: Subject to any disclaimer, the term of this patent is extended or adjusted under 35 U.S.C. 154(b) by 937 days.

(21) Appl. No.: 17/655,545

(22) Filed: Mar. 18, 2022

(65) Prior Publication Data

US 2022/0203558 A1 Jun. 30, 2022

Related U.S. Application Data

(63) Continuation of application No. PCT/CN2020/116077, filed on Sep. 18, 2020.

(30) Foreign Application Priority Data

Sep. 20, 2019 (CN) .......................... 201910894001.8
Sep. 20, 2019 (CN) .......................... 201921572514.9

(51) Int. Cl.
*B25J 15/02* (2006.01)
*B25J 15/08* (2006.01)

(52) U.S. Cl.
CPC ............... *B25J 15/02* (2013.01); *B25J 15/08* (2013.01)

(58) Field of Classification Search
CPC ......... B25J 15/02; B25J 15/12; B25J 15/0226
See application file for complete search history.

(56) References Cited

U.S. PATENT DOCUMENTS 4,002,245 A 1/1977 Mink
4,211,123 A * 7/1980 Mack .................... F16H 19/04
294/203

(Continued)

FOREIGN PATENT DOCUMENTS

CN 101151105 A 3/2008
CN 106584498 A 4/2017

(Continued)

OTHER PUBLICATIONS

Notice of Rejection in Japanese Application No. 2022-518694 mailed on May 15, 2023, 14 pages.

(Continued)

*Primary Examiner* — Thomas E Lazo
(74) *Attorney, Agent, or Firm* — METIS IP LLC

(57) ABSTRACT

The present disclosure relates to a clamp (100). The clamp (100) may include a housing (110), a driving mechanism (120), and a clamping jaw assembly (150). The driving mechanism may be disposed in the housing (110). The clamping jaw assembly (150) may be partially disposed outside the housing (110). The clamping jaw assembly (150) may include at least two clamping jaws. The driving mechanism (120) may drive the clamping jaw assembly (150) to move, such that the clamping jaw assembly (150) switches between a first deformation state and a second deformation state. The at least two clamping jaws may be gathered with each other in the first deformation state, and the at least two clamping jaws may be separated from each other in the second deformation state. The clamp may pick up objects within a certain size range, and may also pick up small-sized and densely arranged objects.

20 Claims, 3 Drawing Sheets

(56) References Cited

U.S. PATENT DOCUMENTS

| | | | | |
|---|---|---|---|---|
| 5,895,084 A | * | 4/1999 | Mauro | B25J 15/12 294/100 |
| 6,331,758 B1 | | 12/2001 | Takanashi et al. | |
| 7,891,227 B2 | * | 2/2011 | Moeck | B25J 15/0226 72/422 |
| 9,075,031 B2 | * | 7/2015 | Jones | B25J 15/0028 |
| 9,914,214 B1 | | 3/2018 | Strauss et al. | |
| 2005/0264019 A1 | * | 12/2005 | Muramatsu | B25B 9/02 294/99.1 |
| 2015/0028613 A1 | | 1/2015 | Nakayama | |
| 2020/0406478 A1 | | 12/2020 | Hatano et al. | |
| 2024/0326207 A1 | * | 10/2024 | Kaye, Jr. | B25B 27/10 |

FOREIGN PATENT DOCUMENTS

| | | | | | |
|---|---|---|---|---|---|
| CN | 107671878 | A | | 2/2018 | |
| CN | 207643173 | U | | 7/2018 | |
| CN | 108638115 | A | * | 10/2018 | B25J 15/10 |
| CN | 109397316 | A | | 3/2019 | |
| CN | 110076808 | A | * | 8/2019 | B23B 31/1176 |
| CN | 110497434 | A | | 11/2019 | |
| CN | 210650716 | U | | 6/2020 | |
| DE | 102018203788 | A1 | | 9/2019 | |
| EP | 1627707 | A1 | | 2/2006 | |
| JP | H01106185 | U | | 7/1989 | |
| JP | H0852679 | A | | 2/1996 | |
| JP | 2019018304 | A | | 2/2019 | |
| WO | 2019017000 | A1 | | 1/2019 | |
| WO | WO-2019118383 | A1 | * | 6/2019 | B25J 13/085 |

OTHER PUBLICATIONS

International Search Report in PCT/CN2020/116077 mailed on Dec. 24, 2020, 8 pages.

Written Opinion in PCT/CN2020/116077 mailed on Dec. 24, 2020, 8 pages.

Notice of Reasons for Rejection in Japanese Application No. 2022-518694 mailed on Sep. 19, 2023, 16 pages.

Communication Pursuant to Article 94(3) EPC in European Application No. 20864365.0 mailed on Sep. 10, 2024, 6 pages.

The Extended European Search Report in European Application No. 20864365.0 mailed on Sep. 23, 2022, 8 pages.

* cited by examiner

CLAMPS

CROSS-REFERENCE TO RELATED APPLICATIONS

This application is a Continuation of International Application No. PCT/CN2020/116077, filed on Sep. 18, 2020, which claims priority of Chinese Patent Application No. 201921572514.9, filed on Sep. 20, 2019, and Chinese Patent Application No. 201910894001.8, filed on Sep. 20, 2019, the entire contents of each of which are hereby incorporated by reference.

TECHNICAL FIELD

The present disclosure generally relates to the field of object clamping techniques, and more particularly, relates to clamps.

BACKGROUND

With the development of technology, some objects are picked up using clamps in industrial production and daily life. The clamps usually include driving mechanisms, transmission mechanisms, and clamping jaws. In the prior art, the transmission mechanisms and the clamping jaws are rigid structures. When the clamping jaws are driven by the rigid transmission mechanism to perform clamping operations, distances between the clamping jaws are fixed, thereby easily causing damage to some non-hard objects. That is, when the rigid clamp in the prior art is used to pick up relatively brittle objects (e.g., eggs, glass bottles, fruits, etc.), it is easy to cause damage to the objects. There is also an airbag clamp in the prior art, which clamps the objects based on deformations of an airbag structure in different air pressures. However, the airbag clamp has extremely high requirements on the airtightness of the airbag, the forming process of the airbag clamp is complex, and the service life of the airbag clamp is not long. Moreover, it is difficult for a flexible finger to be manufactured into a tiny size. Therefore, the airbag clamp is not suitable for picking up some small-sized and densely arranged objects.

SUMMARY

The purpose of the present disclosure is to provide a clamp that can not only pick up objects within a certain size range but also pick up small-sized and densely arranged objects.

An aspect of the present disclosure provides a clamp. The clamp may include a housing, a driving mechanism, and a clamping jaw assembly. The housing may be disposed in the housing. The clamping jaw assembly may be partially disposed outside the housing. The clamping jaw assembly may include at least two clamping jaws. The driving mechanism may be configured to drive the clamping jaw assembly to move, such that the clamping jaw assembly switches between a first deformation state and a second deformation state. The at least two clamping jaws may be gathered with each other in the first deformation state, and the at least two clamping jaws may be separated from each other in the second deformation state.

BRIEF DESCRIPTION OF THE DRAWINGS

In order to more clearly illustrate the technical solutions related to the embodiments of the present disclosure, brief introduction of the drawings referred to in the description of the embodiments is provided below. Obviously, the accompanying drawings described below are only some examples or embodiments of the present disclosure. Those skilled in the art, without further creative efforts, may apply the present disclosure to other similar scenarios according to these drawings, and wherein.

Figure 1:
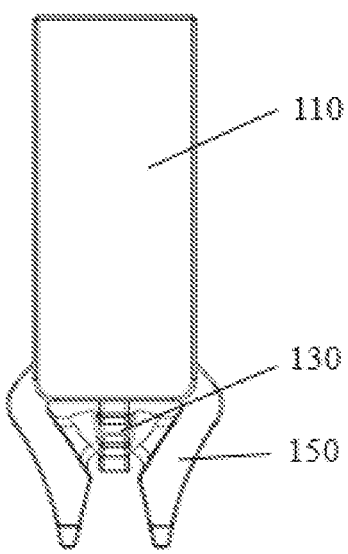
FIG. 1 is a front view illustrating a clamp according to some embodiments of the present disclosure.

In figures, 100 represents a clamp, 110 represents a housing, 120 represents a driving mechanism, 130 represents a connecting component, 140 and 140' represent positioning shafts, 150 represents a clamping jaw assembly, 160 represents an auxiliary disengagement device, 121 represents a cylinder housing, 122 represents a cylinder piston rod, 123 represents a cylinder bracket, 124 represents a mounting nut, 125 represents a fastening nut, 131 represents a connecting rod, 132 represents a cam, 133 represents a slider, and 151 represents a clamping jaw connector.

DETAILED DESCRIPTION

In order to more clearly illustrate purposes, technical solutions, and advantages of the present disclosure, the following further illustrates the present disclosure in detail with reference to the accompanying drawings and embodiments. It should be understood that the specific embodiments described herein are only intended to explain the present disclosure, which is not intended to limit the present disclosure.

On the contrary, the present disclosure covers any alternatives, modifications, equivalents method, and solutions defined by the claims in the spirit and scope of the present disclosure. In order to enable the public to have a better understanding of the present disclosure, some specific details are further described in detail in the following description of the present disclosure. Those skilled in the art may fully understand the present disclosure without the description of the details.

Those skilled in the art will understand that the terms "first," "second," etc., in the present disclosure are only for distinguishing different devices, modules, or parameters, etc., which neither indicates any particular technical meaning, nor indicates an inevitability logical order between them.

Clamps for picking up objects in the prior art may include a transmission clamp and an airbag clamp. The transmission clamp usually uses a pressure change of a cylinder as a motion power source of a rigid connecting mechanism, so that the rigid connecting mechanism can drive a rigid clamping jaw for clamping. However, during a process of using the rigid clamping jaw to clamp through the rigid connecting mechanism, aggregation states of fingers of the rigid clamping jaw are consistent at each time. That is, one rigid clamping jaw can only be matched to clamp objects with one size. For example, when a rigid clamping jaw that can only clamp an object with a diameter of 10 millimeters (mm) clamps an object with a diameter of 12 mm, the rigid clamping jaw may cause damage to the object. When a rigid clamping jaw that can only clamp an object with a diameter of 10 mm clamps an object with a diameter of 8 mm, the rigid clamping jaw may not be able to clamp the object with the diameter of 8 mm due to an insufficient clamping force of the rigid clamping jaw.

The airbag clamp usually clamps the objects based on deformations of an airbag structure in different air pressures. However, the airbag clamp has extremely high requirements on the airtightness of the airbag, the forming process of the airbag clamp is complex, and the service life of the airbag clamp is not long. Moreover, it is difficult for a flexible finger to be manufactured into a tiny size. Therefore, the airbag clamp is not suitable for picking up some small-sized and densely arranged objects.

The embodiments of the present disclosure relates to a clamp, which may not only pick up objects within a certain size range, but may also pick up small-sized and densely arranged objects. The clamp may be applied to operation conditions of clamping various objects, thereby improving an operational efficiency of clamping the objects. Moreover, a clamping member of the clamp in the present disclosure may realize a flexible clamping of the objects. That is, a contact between the clamping member or the clamping jaw and the objects may be a flexible contact. Therefore, the clamping force may be controlled within a certain range, thereby avoided a damage to the clamped object caused by the rigid clamping member due to an excessive gripping force.

Figure 2:
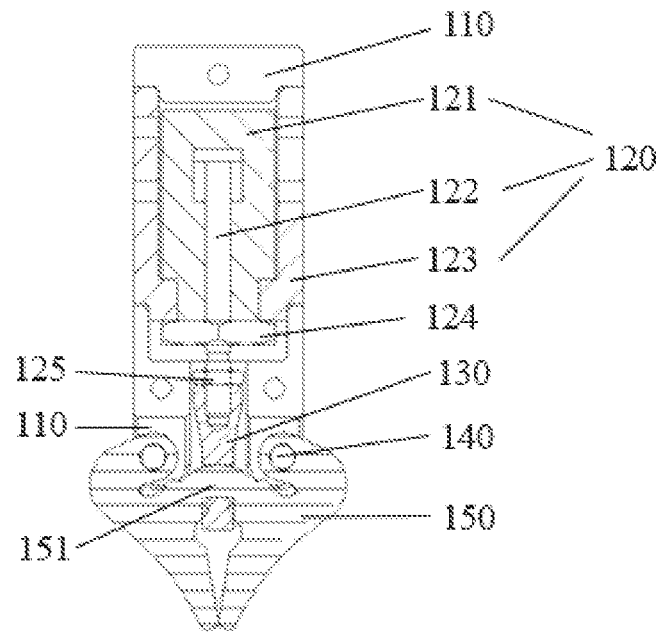
FIG. 2 is a sectional view illustrating a front view of a clamp in a clamping state according to some embodiments of the present disclosure.

FIG. 1 is a front view illustrating a clamp according to some embodiments of the present disclosure. FIG. 2 is a sectional view illustrating a front view of a clamp in a clamping state according to some embodiments of the present disclosure.

Referring to FIG. 1 and FIG. 2, a clamp 100 in some embodiments of the present disclosure may be described in detail. It should be noted that the following embodiments are merely provided for the purposes of illustration, and not intended to limit the scope of the present disclosure.

In some embodiments of the present disclosure, the clamp 100 may include a housing 110, a driving mechanism 120, and a clamping jaw assembly 150. In some embodiments, the driving mechanism 120 may be disposed in the housing 110. The clamping jaw assembly 150 may be partially disposed outside the housing 110. The driving mechanism 120 may be connected to the clamping jaw assembly 150 through a connection. In some embodiments, the connection may include a non-detachable fixing connection, for example, a bonding connection, etc. In some embodiments, the connection may include a detachable fixing connection, for example, a screw connection, etc. In some embodiments, the driving mechanism 120 may directly drive the clamping jaw assembly 150 to move, so that the clamping jaw assembly 150 may be elastically deformed, and then the clamping jaw assembly 150 may switch between a first deformation state and a second deformation state. In some embodiments of the present disclosure, the elastic deformation of the clamping jaw assembly 150 may be used to clamp an object to be clamped within a certain size range. For example, a rigid clamping jaw that can only clamp an object with a diameter of 10 mm may be replaced by the clamping jaw assembly 150 with the elastic deformation in the present disclosure, and the clamping jaw assembly 150 in the present disclosure may clamp an object with a diameter from 8 mm to 10 mm. Therefore, the elastic deformation of the clamping jaw assembly 150 may improve practicability of a clamp. In addition, due to the elasticity of the clamping jaw assembly 150, the clamping jaw assembly 150 may avoid a damage to an object to be clamped with a thin thickness, a weak strength, and/or internal and/or external surfaces that are easily damaged.

In some embodiments, in the first deformation state, at least two clamping jaws of the clamping jaw assembly 150 may be gathered with each other to clamp the object to be clamped. In the second deformation state, the at least two clamping jaws of the clamping jaw assembly 150 may be separated from each other to release the object to be clamped. In some embodiments, in the first deformation state, the at least two clamping jaws of the clamping jaw assembly 150 may be separated from each other to release the object to be clamped. In the second deformation state, the at least two clamping jaws of the clamping jaw assembly 150 may be gathered with each other to clamp the object to be clamped. Therefore, in some embodiments of the present disclosure, the first deformation state and the second deformation state may be used to describe a relative positional relationship of the at least two clamping jaws of the clamping jaw assembly 150 to represent that the clamping jaw assembly 150 clamps and releases the object to be clamped. The relative positional relationship of the at least two clamping jaws of the clamping jaw assembly 150 in the first deformation state and the second deformation state may not be limited in the embodiments of the present disclosure. That is, the first deformation state and the second deformation state in some embodiments of the present disclosure may be used to distinguish two different relative positional relationships of the at least two clamping jaws of the clamping jaw assembly 150.

In some embodiments, the housing 110 may be configured to enclose the driving mechanism 120. The housing 110 may be configured to enclose the clamping jaw assembly 150. In some embodiments, the housing 110 may further be configured to enclose a portion of the clamping jaw assembly 150. An operation environment of the clamp 100 in the present disclosure may include a special environment, for example, an indoor, an outdoor, an underwater, a special media, etc. Therefore, a material of the housing 110 may be determined based on the special environment of the clamp 100. The material of the housing 110 may not be limited in the present disclosure.

In some embodiments, the driving mechanism 120 may be disposed in the housing 110. For example, the driving mechanism 120 may be completely disposed in the housing 110. A portion of the driving mechanism 120 may also be disposed in the housing 110. In some embodiments, the driving mechanism 120 may be connected to the housing 110 through a connection. The connection may include a detachable connection, for example, a screw connection, a clamping connection, etc. In some embodiments, the driving mechanism 120 may be connected to the clamping jaw assembly 150 through a connection. The connection may be a fixing connection, for example, a bonding connection, etc. The driving mechanism 120 may provide power for the clamping jaw assembly 150, and the driving mechanism 120 may switch the clamping jaw assembly 150 between the first deformation state and the second deformation state. That is, the driving mechanism 120 may cause the clamping jaw assembly 150 to clamp and/or release the object to be clamped. In some embodiments of the present disclosure, the driving mechanism 120 may include a pneumatic drive, an electrical drive, a hydraulic drive, etc. Compared with the prior art in which the rigid clamping jaws are driven by a rigid transmission mechanism to clamp the object to be clamped, the clamp 100 provided in the embodiments of the present disclosure may not need a transmission mechanism when clamping the object to be clamped. Therefore, the clamp 100 in the embodiments of the present disclosure may be simpler in structure, smaller in volume, and lower in manufacturing cost than the prior art. Meanwhile, in the solution with the transmission mechanism, during the process of clamping the object, the driving mechanism 120 needs a larger force to drive the transmission mechanism to operate due to a large friction during the operation of the transmission mechanism. Therefore, the clamp 100 provided in the embodiments of the present disclosure may be more energy-saving and have a longer service life. In addition, due to the large friction during the operation of the transmission mechanism, parts of the transmission mechanism need to be replaced regularly. The parts of the transmission mechanism are generally expensive, which may increase a later maintenance cost of the clamp. Therefore, the clamp 100 provided in the embodiments of the present disclosure may have advantages of long service life, and being more energy-saving, and more economical.

In some embodiments, the clamping jaw assembly 150 may be rotatably connected to the housing 110, for example, through a pin connection, etc. When the driving mechanism 120 drives the clamping jaw assembly 150 to switch from the first deformation state (or the second deformation state) to the second deformation state (or the first deformation state), the at least two clamping jaws of the clamping jaw assembly 150 may be rotated. In some embodiments, the clamping jaw assembly 150 may include the at least two clamping jaws. For example, the clamping jaw assembly 150 may include two clamping jaws. As another example, the clamping jaw assembly 150 may include three clamping jaws. As still another example, the clamping jaw assembly 150 may include four clamping jaws, etc. A count (or number) of clamping jaws of the clamp 100 may not be limited in the embodiments of the present disclosure. The count (or number) of clamping jaws may be set according to a property (e.g., a shape, etc.) of the object to be clamped. Compared with an airbag clamp, the clamping jaw assembly 150 in the embodiments of the present disclosure may clamp the object to be clamped through ends of fingers of the at least two clamping jaws. Therefore, the clamp 100 provided in the embodiments of the present disclosure may be suitable for clamping densely arranged objects in a narrow space. In some embodiments, a plurality of clamping jaws of the clamping jaw assembly 150 may be distributed circumferentially or evenly distributed around a circumference. The distribution of the plurality of clamping jaws of the clamp 100 may not be limited in the embodiments of the present disclosure, and only the plurality of clamping jaws of the clamping jaws component 150 may clamp the object to be clamped.

In some embodiments, in order to enable the clamping jaw assembly 150 to elastically deform or switch between the two deformation states (i.e., the first deformation state and the second deformation state), a material of the clamping jaw assembly 150 may include a flexible material. In some embodiments, using flexibility and elasticity of the flexible material, the flexible clamping jaws may switch from the first deformation state to the second deformation state under an action of an external force. When the external force is released, the flexible clamping jaws may return to the first deformation state. In some embodiments, the material of the clamping jaw assembly 150 may include an elastic metal sheet. In some embodiments, the elastic metal sheet may be bent and deformed within a certain elastic deformation range, so that the elastic metal sheet may switch from the first shape state to the second shape state when an external force is applied. When the external force is released, the elastic metal sheet may automatically return to the first shape state. In some embodiments, a portion of the clamping jaw assembly 150 may further include a rigid material. A portion of the clamping jaw assembly 150 may include the flexible material. For example, at least one clamping jaw of the clamping jaw assembly 150 may include the flexible material. In some embodiments, at least a portion of the at least one clamping jaw of the clamping jaw assembly 150 may include the flexible material. In some embodiments, the at least one clamping jaw of the clamping jaw assembly 150 may include the flexible material. In some embodiments, when a portion of the at least one clamping jaw of the clamping jaw assembly 150 includes the flexible material, the clamping jaws of the clamping jaw assembly 150 may be connected through the elastic steel sheet. In some embodiments, the elastic steel sheet may make the clamping jaw assembly 150 elastic. The flexible material of the portion of the clamping jaw may make the clamping jaw assembly 150 flexible. The flexibility of the clamping jaw assembly 150 may prevent damage to the object to be clamped when the clamping jaw assembly 150 picks up the object to be clamped.

In some embodiments, the flexible material may refer to a material with a certain elasticity. For example, the flexible material may include an elastic material. The flexible material may include silica gel. For example, the silica gel may include thermally vulcanized solid organic silica gel, fluoro silica gel, liquid silica gel, etc. The silica gel may have excellent properties such as high and low-temperature stability, wide hardness range (e.g., 10-80 Shore hardness), chemical resistance, good sealing performance, good electrical property, compression deformation resistance, etc. Compared with conventional organic elastomers, silica gel may be particularly easy to be processed and manufactured. The silica gel may be molded, calendered, and extruded under a condition of low energy consumption, and the manufacturing efficiency may be high. A tensile strength may refer to a force required to tear a sample of silica gel in each range unit. A tensile strength of the thermally vulcanized solid organic silica gel may be within a range from 4.0 MPa to 12.5 MPa. A tensile strength of the fluoro silica gel may be within a range from 8.7 MPa to 12.1 MPa. A tensile strength of the liquid silica gel may be within a range from 3.6 MPa to 11.0 MPa. An elongation may refer to an "ultimate breaking elongation" or a percent that an increased length of a sample relative to an original length of the sample when the sample is broken. An elongation of the thermally vulcanized solid silica gel may be within a range from 90% to 1120%. An elongation of the fluoro silica gel may be within a range from 159% to 699%. An elongation of the liquid silica gel may be within a range from 220% to 900%. The elongation of the sample may be altered according to different manufacture processes, hardeners, and temperature choices. By selecting the material of the clamping jaw assembly 150 as the silica gel, when an outer surface or an inner side surface of the object to be clamped includes a complex contour, the clamping jaw assembly 150 may be effectively attached to the outer surface or the inner side surface of the target object (i.e., the object to be clamped) since the silica gel can produce a great deformation. Therefore, the clamping jaw assembly 150 may be used to clamp the object to be clamped without complicated design in advance. In some embodiments, the material of the clamping jaw assembly 150 may also include a rubber. For example, the rubber may include a natural rubber, a styrene-butadiene rubber, a butadiene rubber, an isoprene rubber, etc. In some embodiments, the material of the clamping jaw assembly 150 may also include a thermoplastic elastomer or an elastic composite material. For example, the clamping jaw assembly 150 may be manufactured using a styrene thermoplastic elastomer (TPE) (e.g., styrene-butadiene-styrene block copolymer (SBS), styrene-ethylene-butylene-styrene block copolymer (SEBS), styrene-ethylene/propylene-styrene block copolymer (SEPS), ethylene-propylene-diene monomer (EPDM)/styrene, butadiene rubber (BR)/styrene, isobutylene isoprene rubber (CI-IIR)/styrene, nonylphenol polyoxyethylene (NP)/styrene, etc.), olefin thermoplastic elastomer (e.g., dynamically vulcanized thermoplastic polyolefin (TPO)), diene thermoplastic elastomer, etc. As another example, the clamping jaw assembly 150 may be manufactured using the elastic composite material, for example, polyolefin elastomer (POE), etc. The clamping jaw assembly 150 in the embodiments of the present disclosure may use the flexible material. When the clamping jaw assembly 150 clamps the object to be clamped, a contact area between the clamping jaw assembly 150 and the object to be clamped may be increased, so that the object to be clamped may not easily fall off from the clamp 100 during the process of clamping the object to be clamped. At the same time, the clamping jaw assembly 150 in the embodiments of the present disclosure may further avoid causing clamping damage to the object to be clamped.

In some embodiments, a size of the elastic deformation of the clamping jaw assembly 150 may relate to the material of the clamping jaw. For example, the better the elasticity of the material of the clamping jaw is, the greater the elastic deformation of the clamping jaw assembly 150 may be generated, the greater a relative displacement of the at least two clamping jaws may be generated, and the larger size range of the object that can be clamped by the clamping jaw assembly 150 may be. In some embodiments, the size of the elastic deformation of the clamping jaw assembly 150 may further relate to a magnitude of the force applied by the driving mechanism 120. For example, when the driving mechanism 120 is a cylinder, the size of the elastic deformation of the clamping jaw assembly 150 may relate to a stroke of a piston of the cylinder. In some embodiments, the greater the force transmitted by the driving mechanism 120 to the clamping jaw assembly 150 is, the greater the elastic deformation of the clamping jaw assembly 150 may be generated, and the greater the relative displacement of the at least two clamping jaws may be generated. For example, the greater the force transmitted by the driving mechanism 120 to the clamping jaw assembly 150 is, the smaller a distance between the at least two clamping jaws of the clamping jaw assembly 150 may be when the at least two clamping jaws are gathered with each other. As another example, the greater the force transmitted by the driving mechanism 120 to the clamping jaw assembly 150 is, the greater the distance between the at least two clamping jaws of the clamping jaw assembly 150 may be when the at least two clamping jaws are separated from each other. In some embodiments, the size of the elastic deformation of the clamping jaw assembly 150 may also relate to a geometrical feature of an end (a part of the clamping jaw that plays a main clamping role when clamping the object to be clamped) of the clamping jaw.

The clamp 100 in the embodiments of the present disclosure may not limit the clamping manner of the clamping jaw assembly 150. In some embodiments, the clamp 100 may clamp the object to be clamped through the clamping jaw assembly 150 contacting with the outer surface of the object to be clamped. In some embodiments, the clamp 100 may also pick up the object to be clamped through the clamping jaw assembly 150 contacting with an inner wall of the object to be clamped. That is, the clamping jaw assembly 150 may pick up the object to be clamped by holding the inner wall of the object to be clamped from an inner side of the object to be clamped. For example, when the object to be clamped includes an object (e.g., a beaker, etc.) with an inner diameter, the clamping jaw assembly 150 of the clamp 100 may be entered into the inner side of the object to be clamped in the first deformation state (the clamping jaws are gathered with each other). The driving mechanism 120 may be initiated. The driving mechanism 120 may drive the clamping jaw assembly 150 to switch to the second deformation state (the clamping jaws are separated from each other). When the clamping jaw assembly 150 holds the inner wall of the object to be clamped, the object to be clamped may be picked up. In some embodiments, the clamp 100 may further clamp the object to be clamped through at least one clamping jaw of the clamping jaw assembly 150 contacting with the outer surface of the object to be clamped, and the at least one clamping jaw of the clamping jaw assembly 150 contacting with the inner wall of the object to be clamped. That is, the clamp 100 may clamp the object to be clamped through the at least two clamping jaws of the clamping jaw assembly 150 contacting with the inner wall and the outer surface of the object (e.g., the beaker, etc.) to be clamped, respectively.

In some embodiments, the clamp 100 may further include a connecting component 130. One end of the connecting component 130 may be connected to the driving mechanism 120, and another end of the connecting component 130 may be connected to the clamping jaw assembly 150. In some embodiments, the connecting component 130 disposed between the driving mechanism 120 and the clamping jaw assembly 150 may be used for motion transmission or motion conversion, so that the motion of the driving mechanism 120 may drive the clamping jaw assembly 150 to switch from the first deformation state to the second deformation state. For example, the connecting component 130 may transmit a linear motion of the driving mechanism 120 to the clamping jaw assembly 150. As another example, the connecting component 130 may convert a rotational motion of the driving mechanism 120 into a linear motion, thereby driving a motion of the clamping jaw assembly 150. In some embodiments, when the driving mechanism is a linear motion mechanism, the connecting component 130 may include a connector for transmitting the linear motion of the drive mechanism to the clamping jaw assembly 150. In some embodiments, when the driving mechanism is a rotary motion mechanism, the connecting component 130 may include an assembly including a cam and a connecting rod. More descriptions of the connecting component 130 with reference to the figures may be found elsewhere in the present disclosure.

The clamp 100 in the embodiments of the present disclosure may not limit the connecting component 130. The driving mechanism 120 and the connecting component 130 of the clamp 100 in the embodiments of the present disclosure may be selected according to a specific environment and an operation condition.

In some embodiments, the driving mechanism 120 may include a linear driving mechanism. In some embodiments, the linear driving mechanism may include a cylinder piston driving mechanism. As shown in FIG. 2, the driving mechanism 120 may be a linear driving mechanism, and the driving mechanism 120 may include a cylinder housing 121, a cylinder piston rod 122, and a cylinder bracket 123. The cylinder housing 121 may be fixedly connected to the housing 110 of the clamp 100. In some embodiments, the fixed connection may include a welding connection, etc. The cylinder housing 121 may further be connected to the housing 110 of the clamp 100 through the cylinder bracket 123 and a mounting nut 124. The cylinder piston rod 122 may perform a reciprocating linear motion under the driving of the driving mechanism 120. In some other embodiments, the driving mechanism may further include a rotary driving mechanism. In an embodiment of a rotary driving mechanism, a connecting component with a motion conversion function may be required between the clamping jaw assembly and the driving mechanism. The connecting component may convert a rotation of the driving mechanism into a linear motion, and transmit the linear motion to the clamping jaw assembly, thereby achieving that the clamping jaw assembly may switch between the two deformation states. In some embodiments, the connecting component may include a cam component. The cam component may include a first cam for connecting with the driving mechanism and a second cam for connecting with the clamping jaw assembly. A matching connection of the first cam and the second cam may cause a rotation of the first cam to drive a linear motion of the second cam.

As shown in FIG. 1 and FIG. 2, the connecting component 130 may include a connector. One end of the connector may be fixedly connected to the driving mechanism 120. For example, the one end of the connector may be connected to the cylinder piston rod 122 by a fastening nut 125. Another end of the connector may be fixedly connected to the at least two clamping jaws through a connection. The fixed connection may include a bonding connection, etc. The clamp 100 may further include a positioning shaft 140. The positioning shaft 140 may be configured to rotatably fix the at least two clamping jaws to the housing 110. When the clamping jaw assembly 150 switches from the first deformation state to the second deformation state, the at least two clamping jaws may rotate around the positioning shaft 140. For example, the at least two clamping jaws rotating around the positioning shaft 140 may include that end portions of the at least two clamping jaws rotate around the positioning shaft 140.

FIG. 2 is a sectional view illustrating a front view of a clamp in a clamping state according to some embodiment of the present disclosure. Merely by way of example, the clamp 100 may be a two-finger clamp. Two ends of the clamping jaw assembly 150 may be equipped with jaw positioning holes. The housing 110 may be equipped with one or more housing positioning holes. The positioning shaft 140 may be matched with the jaw positioning holes and the one or more housing positioning holes. That is, the two ends of the clamping jaw assembly 150 may be rotatably connected to the housing 110 through the positioning shaft 140. In some embodiments, a count (or number) of the positioning shaft 140 may be the same as a count (or number) of the clamping jaws of the clamping jaw assembly 150. The count (or number) of positioning shafts 140 may be determined based on the count (or number) of the clamping jaws, which may improve a clamping force of the clamping jaws. The count (or number) of positioning shafts 140 may be 2, 3, 4, etc. As shown in FIG. 2, the clamp 100 may be a two-finger clamp, the count (or number) of the clamping jaws in the clamping jaw assembly 150 may be 2, and the count (or number) of the positioning shafts 140 may be 2. The two clamping jaws of the clamping jaw assembly 150 may be connected through a clamping jaw connector 151. The connection may include an integral connection, a bonding connection, etc. FIG. 2 is a sectional view illustrating a front view of a two-finger clamp in a clamping state according to some embodiments of the present disclosure. Another end of the connector may be fixedly connected to the clamping jaw connector 151 of the clamping jaw assembly 150. In some other embodiments, the clamping jaw connector may not be used. That is, each clamping jaw in the clamping jaw assembly may be directly connected to the connector. When the cylinder of the driving mechanism 120 is initiated and the cylinder piston rod 122 extends out of the cylinder housing 121, the cylinder piston rod 122 may drive the connector connected to the cylinder piston rod 122 to push outward, the connector may drive the clamping jaw connector 151 connected to the connector to push outward, and the clamping jaw assembly 150 may be elastically deformed. The two ends of the clamping jaw assembly 150 may rotate around the positioning shaft 140, and clamping ends of the clamping jaw assembly 150 may be opened. The process may be configured to release the object to be clamped.

Figure 3:
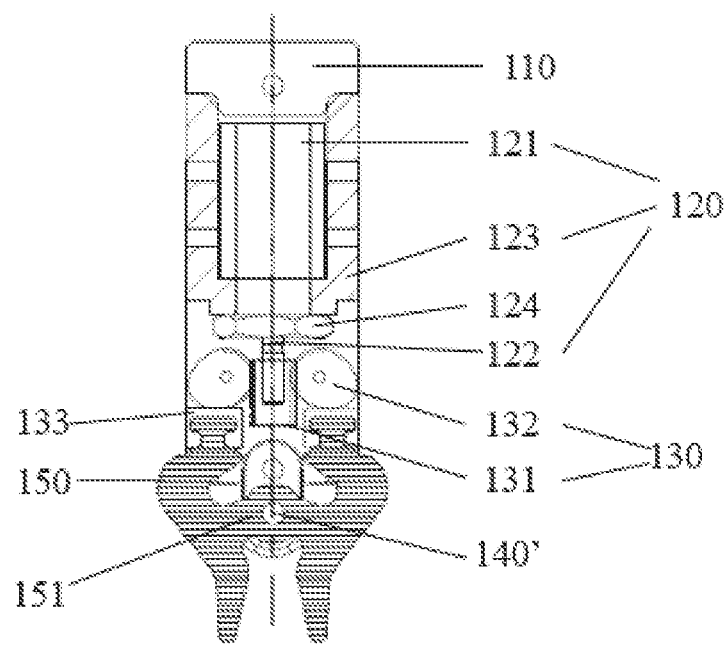
FIG. 3 is a sectional view illustrating a front view of a clamp in a releasing state according to some other embodiments of the present disclosure.
Figure 4:
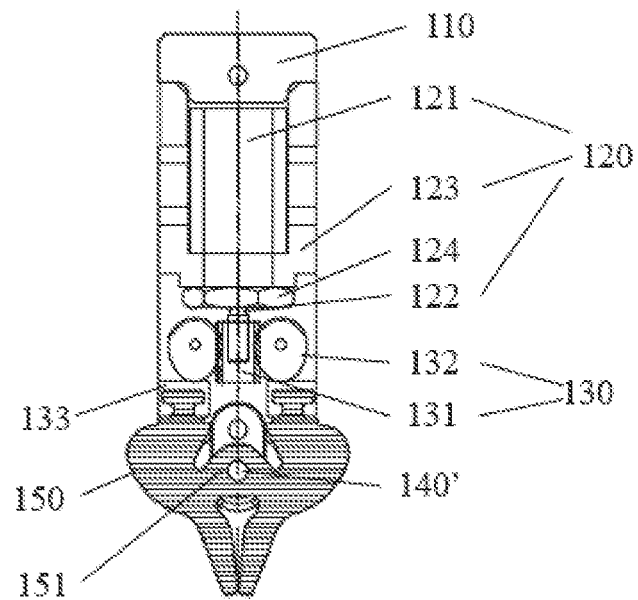
FIG. 4 is a sectional view illustrating a front view of a clamp in a clamping state according to some other embodiments of the present disclosure.

In some embodiments, the connecting component 130 may include a cam portion and a connecting rod 131. One end of the connecting rod 131 may be connected to the driving mechanism 120. The driving mechanism 120 may include a linear driving mechanism, and the linear driving mechanism may include a cylinder piston driving mechanism. As shown in FIG. 3 and FIG. 4, the driving mechanism 120 may include the cylinder housing 121, the cylinder piston rod 122, and the cylinder bracket 123. The cylinder housing 121 may be fixedly connected to the housing 110 of the clamp 100. The fixing connection may include a welding connection, etc. The cylinder housing 121 may further be connected to the housing 110 of the clamp 100 through the cylinder bracket 123 and the mounting nut 124. The cylinder piston rod 122 may perform the reciprocating linear motion under the driving of the driving mechanism 120. The one end of the connecting rod 131 may be connected to the cylinder piston rod 122 by the fastening nut 125. Another end of the connecting rod 131 may be connected to the cam portion, and the cam portion may be abutted against the clamping jaw assembly 150. In some embodiments, the connecting rod 131 may be engaged to the cam portion. The connecting rod 131 may include a first tooth portion. The cam portion may include a second tooth portion. The first tooth portion and the second tooth may be engaged to achieve a rotation of the cam portion. In some embodiments, the first tooth portion and the second tooth portion may include one or more consecutive teeth. Since a driving stroke of the driving mechanism 120 affects a stroke of the connecting component 130, a degree of elastic deformation of the clamping jaw assembly 150 may also be affected. Therefore, a count (or number) of consecutive teeth may not be limited in the embodiment of the present disclosure. The count (or number) of consecutive teeth in the present disclosure may be selected according to the degree of elastic deformation of the clamping jaw assembly 150, the driving stroke of the driving mechanism 120, and/or properties (e.g., a size, a shape, etc.) of the object to be clamped. In some embodiments, the cam portion may include a cam 132. The cam 132 may be fixed to the housing 110 through a cam fixing shaft. The cam 132 may rotate around the cam fixating shaft. A particular shape of the cam 132 may not be limited in the embodiments of the present disclosure. The cam 132 may be selected according to actual conditions. The cam 132 may include a second tooth portion. The first tooth portion and the second tooth portion may be engaged to achieve the rotation of the cam 132. When the driving mechanism 120 drives the connecting rod 131, the rotation of the cam portion (or the cam 132) may drive the clamping jaw assembly 150 to switch between the first deformation state and the second deformation state.

FIG. 3 is a sectional view illustrating a front view of a clamp in a releasing state according to some other embodiments of the present disclosure. FIG. 4 is a sectional view illustrating a front view of a clamp in a clamping state according to some other embodiments of the present disclosure.

In some embodiments, the count (or number) of the positioning shafts 140 may be different from the count (or number) of the clamping jaws in the clamping jaw assembly 150. As shown in FIG. 3 and FIG. 4, the clamp 100 may be a two-finger clamp. The count (or number) of the clamping jaws of the clamping jaw assembly 150 may be 2. The two clamping jaws of the clamping jaw assembly 150 may be connected through the clamping jaw connector 151. The connection may include an integral connection, a bonding connection, etc. The clamping jaw connector 151 may be equipped with a clamping jaw positioning hole. The housing 110 may include only one housing positioning hole. The clamp 100 may further include a positioning shaft 140'. The positioning shaft 140' may be matched with the clamping jaw positioning hole and the housing positioning hole. That is, the positioning shaft 140' may be fixedly connected to the housing positioning hole and the clamping jaw positioning hole. In the embodiments of the present disclosure, the clamping jaw assembly 150 being rotatably connected to the housing 110 through the clamping jaw connector 151 and the positioning shaft 140' may be further applicable to a multi-finger clamp (e.g., a three-finger clamp, a four-finger clamp, etc.). The clamping jaw assembly 150 may be rotatably connected to the housing 110 through the positioning shaft 140'. When the clamping jaw assembly 150 switches from the first deformation state (or the second deformation state) to the second deformation state (or the first deformation state), the two clamping jaws may rotate around the positioning shaft 140'. In some embodiments, the end of the clamping jaw assembly 150 may be equipped with a slider 133. The slider 133 may be abutted against the cam 132. In some embodiments, a material of the slider 133 may include a rigid material. A count (or number) of the slider 133 may be the same as the count (or number) of the clamping jaws of the clamping jaw assembly 150. In the embodiments of the present disclosure, a clamping end of the clamping jaw may refer to a contact end of the clamping jaw assembly 150 with the object to be clamped. An end of the clamping jaw may refer to another end of the clamping jaw assembly 150 opposite to the contact end. That is, the end of the clamping jaw may refer to one end of the clamping jaw assembly 150 that is not in contact with the object to be clamped. The slider 133 may be configured to convert the rotation of the cam 132 to a linear motion and transmit the linear motion to the clamping jaw assembly 150, so that the clamping jaw assembly 150 is elastically deformed to switch from the first deformation state (or the second deformation state) to the second deformation state (or the first deformation state).

As shown in FIG. 3, FIG. 3 is a sectional view illustrating a front view of a two-finger clamp in a releasing state according to some embodiments of the present disclosure. When the driving mechanism 120 is initiated and the cylinder piston rod 122 extends out of the cylinder housing 121, the cylinder piston rod 122 may drive the connecting rod 131 connected with the cylinder piston rod 122 to push outward. The connecting rod 131 may drive the cam 132 engaged to the connecting rod 131 to rotate around the cam fixed shaft. The cam 132 may push the slider 133 outward during the rotation. That is, a distance between the cam fixed shaft and the slider 133 may be increased. The clamping jaw assembly 150 may be elastically deformed, and the two ends of the clamping jaw assembly 150 may be further squeezed downward. The clamping jaw connector of the clamping jaw assembly 150 may rotate around the positioning shaft 140'. The clamping end of the clamping jaw assembly 150 may be gathered. The process may be configured to clamp the object to be clamped.

As shown in FIG. 4, FIG. 4 is a sectional view illustrating a front view of a clamp in a clamping state according to some embodiments of the present disclosure. When the driving mechanism 120 is initiated, the cylinder piston rod 122 may be retracted toward the cylinder housing 121. The cylinder piston rod 122 may drive the connecting rod 131 connected with the cylinder piston rod 122 to pull inward. The connecting rod 131 may drive the cam 132 engaged to the connecting rod 131 to rotate around the cam fixed shaft. That is, the distance between the cam fixed shaft and the slider 133 may be decreased. During the rotation of the cam 132, due to the elastic deformation of the clamping jaw assembly 150, the clamping jaw connector of the clamping jaw assembly 150 may rotate around the positioning shaft 140', and the clamping jaw assembly 150 may be restored to an original shape under an action of its own elastic restoring force. The two ends of the clamping jaw assembly 150 may be restored to original shapes upward. The clamping end of the clamping jaw assembly 150 may be released. The process may be configured to release the object to be clamped. During the process, the slider 133 may be caused to move to an end of the cam 132 under the action of the elastic restoring force of the clamping jaw assembly 150, and the slider 133 may move to abut against a lower end of the cam 132. In some other embodiments, the clamp may not include a connecting component, and the driving mechanism for linear motion may directly drive the clamping jaw assembly to switch between the two deformation states, thereby achieving the operation conditions of clamping or releasing.

In some embodiments, the cam portion may include a cam and a gear coaxially fixed to the cam. The cam may be fixed to the housing 110 through a cam fixing shaft. The gear may be fixed to the housing 110 through a gear fixing shaft. The cam fixing shaft and the gear fixing shaft may be coaxial. Both the cam and the gear may rotate around the cam fixing shaft and/or the gear fixing shaft. Specific shapes of the cam and the gear may not be limited in the embodiments of the present disclosure. The cam and the gear may be selected according to actual conditions. The gear may include a second tooth portion. The first tooth portion and the second tooth portion may be engaged to achieve the rotation of the cam. When the driving mechanism 120 drives the connecting rod 131, the gear may be driven to rotate through the engagement of the first tooth portion of the connecting rod 131 and the second tooth portion of the gear. Since the gear and the cam are disposed coaxially, the cam may be further driven to rotate. The cam may be abutted against the slider 133 so as to drive the clamping jaw assembly 150 to switch between the first deformation state and the second deformation state.

Figure 5:
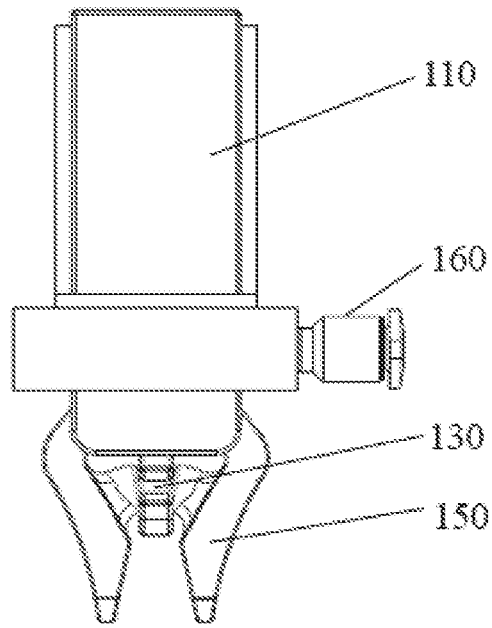
FIG. 5 is a front view illustrating a clamp within an auxiliary disengagement mechanism according to some embodiments of the present disclosure.

FIG. 5 is a front view illustrating a clamp within an auxiliary disengagement mechanism according to some embodiments of the present disclosure.

The clamp 100 in the embodiments of the present disclosure may also include an auxiliary disengagement device 160. When the clamp 100 is expected to be disengaged from the object to be clamped, the clamping jaw assembly 150 may not be disengaged from the object to be clamped in time due to electrostatic adsorption or other reasons. By disposing the auxiliary disengagement device 160 on the housing 110, when the clamp 100 needs to be disengaged from the object to be clamped, the auxiliary disengagement device 160 may assist the object to be clamped to disengage from the clamp 100.

In some embodiments, the auxiliary disengagement device 160 may include an air-jet structure. The air-jet structure may be disposed on the clamp 100. In a usage state, the air-jet structure may be connected to an inflating and deflating device. For example, the air-jet structure may be an air-jet nozzle disposed outside the clamp 100, and the air-jet nozzle may be connected to the inflating and deflating device in an installation or usage state. For instance, the air-jet structure may include a nozzle with an annular structure, and the nozzle may be equipped with air-jet holes distributed in an annulus. In the installation state, the nozzle may be fixedly connected to the clamp 100, and the nozzle with the annular structure may be disposed coaxially with the clamp 100, so that the air-jet holes distributed in the annulus are evenly distributed along a central axis of the housing 110 and face the clamping jaw assembly 150. When the clamping jaw assembly 150 is released, if the object to be clamped is not disengaged from the clamping jaw assembly 150, air may be blown to a contact place between the clamping jaw assembly 150 and the object to be clamped through the air-jet nozzle. An interference may be applied to the object to be clamped, so that the object falls off from the clamping jaw assembly 150. By disposing the air-jet structure on the clamp 100, when the object to be clamped needs to be disengaged from the clamping jaw assembly 150, the air-jet structure may be used to spray at the contact place between the clamping jaw assembly 150 and the object to be clamped, so as to assist the object to be clamped to disengage from the clamping jaw assembly 150.

In some embodiments, the auxiliary disengagement device 160 may include a retractable push rod. The retractable push rod may be disposed on the clamp 100. For example, the retractable push rod may include a pneumatic retractable rod. The pneumatic retractable rod may be mounted on the clamp 100 or form an integrated structure with the clamp 100. After the clamping jaw assembly 150 is released, if the object to be clamped is not disengaged from the clamping jaw assembly 150, the retractable push rod may be extended to touch the object to be clamped, thereby disengaging the object to be clamped from the clamping jaw assembly 150.

In some embodiments, the auxiliary disengagement device 160 may further include a vibration device. The clamp 100 may be disposed on the vibration device. For example, a micro-vibration device may be mounted on the clamp 100. When the clamping jaw assembly 150 is released, if the object to be clamped is not disengaged from the clamping jaw assembly 150, the clamp 100 may be vibrated or shaken by the micro-vibration device, so as to disengage the object to be clamped from the clamping jaw assembly 150. For example, the vibration device may include a mobile phone vibrator in an existing mobile phone, or a similar mechanism or device.

In the embodiments of the present disclosure, since some objects (e.g., a plastic bottle) to be clamped have a certain viscosity, when the clamp 100 clamps a viscous object to be clamped to a preset position and needs to put down the vicious object to be clamped, the viscous object to be clamped may be stuck to the clamping jaw, so that the viscous object to be clamped may not be disengaged from the clamping jaw assembly 150. At this time, the viscous object to be clamped may be disengaged from the clamping jaw assembly 150 by the auxiliary disengagement device 160. If the auxiliary disengagement device 160 is not disposed, the viscous object to be clamped needs to be manually disengaged from the clamping jaw assembly 150, which not only wastes unnecessary human resources, but also affects clamping efficiency. Therefore, the auxiliary disengagement device 160 may increase the clamping efficiency of the clamp 100, and improve the practicability of the clamp 100.

The possible beneficial effects of the embodiments of the present disclosure may include but not limited to the followings.

Compared with the prior art in which a rigid clamping jaw is driven to clamp an object to be clamped through a rigid transmission mechanism, the clamp 100 provided in some embodiments of the present disclosure may need no transmission mechanism when clamping the object to be clamped. Therefore, the clamp 100 in the embodiments of the present disclosure may be simple in structure, small in volume, and have low manufacturing cost. At the same time, since a friction of the transmission mechanism is large during the operation (clamping the object), the driving mechanism 120 may need more force to drive the transmission mechanism to operate. Therefore, the clamp 100 provided in the embodiments of the present disclosure may be energy-saving and have a long service life. In addition, due to the large friction during the operation of the transmission mechanism, the transmission mechanism may need to replace parts regularly, and the parts of the transmission mechanism may be expensive, which increases a later maintenance cost of the clamp. Therefore, the clamp 100 provided in the embodiments of the present disclosure may have advantages of long service life, energy-saving, and economy. Moreover, the clamping jaw assembly 150 in the embodiments of the present disclosure may include a flexible material. When clamping the object to be clamped, the clamping jaw assembly 150 may increase a contact area between the clamping jaw assembly 150 and the object to be clamped, so that the object to be clamped may not easily fall off from the clamp 100 during the process of clamping the object to be clamped. At the same time, the clamping jaw assembly 150 in the embodiments of the present disclosure may further prevent the clamping jaw assembly 150 from causing clamping damage to the object to be clamped. In addition, the clamp 100 in the embodiments of the present disclosure may not only pick up objects within a certain size range, but also pick up small-sized and densely arranged objects.

The above embodiments may be only preferred embodiments of the present disclosure and may not be intended to limit the scope of the present disclosure. Any modifications, equivalent replacements, and improvements made within the spirit and principles of the present disclosure shall be included in the scope of the present disclosure.

What is claimed is:
1. A clamp, comprising:
a housing includes only one housing positioning hole;
a driving mechanism disposed in the housing;
a clamping jaw assembly partially disposed outside the housing, the clamping jaw assembly including at least two clamping jaws; wherein the driving mechanism is configured to drive the clamping jaw assembly to move, such that the clamping jaw assembly switches between a first deformation state and a second deformation state;

the at least two clamping jaws are gathered with each other in the first deformation state, and the at least two clamping jaws are separated from each other in the second deformation state; and only one positioning shaft configured to rotatably fix the at least two clamping jaws to the housing, wherein the positioning shaft is matched with the housing positioning hole, and while the clamping jaw assembly switches from the first deformation state to the second deformation state, the at least two clamping jaws rotate around the positioning shaft.

2. The clamp of claim 1, wherein at least a portion of at least one clamping jaw of the clamping jaw assembly includes a flexible material.

3. The clamp of claim 1, further comprising:
a connecting component, one end of the connecting component being connected to the driving mechanism, and another end of the connecting component being connected to the clamping jaw assembly.

4. The clamp of claim 3, wherein the connecting component includes a cam portion and a connecting rod, one end of the connecting rod being connected to the driving mechanism, the another end of the connecting rod being connected to the cam portion, the cam portion abutting against the clamping jaw assembly; wherein
when the driving mechanism drives the connecting rod, the cam portion is rotated to drive the clamping jaw assembly to switch between the first deformation state and the second deformation state.

5. The clamp of claim 4, wherein the connecting rod is engaged to the cam portion, the connecting rod including a first tooth portion, and the cam portion including a second tooth portion; wherein
the first tooth portion and the second tooth portion are engaged so as to rotate the cam portion.

6. The clamp of claim 5, wherein the cam portion includes a cam, the cam including the second tooth portion; wherein
the first tooth portion and the second tooth portion are engaged so as to rotate the cam.

7. The clamp of claim 5, wherein the cam portion includes a cam and a gear coaxially disposed with the cam, the gear including the second tooth portion; wherein
the first tooth portion and the second tooth portion are engaged so as to rotate the cam.

8. The clamp of claim 4, wherein
an end of the clamping jaw assembly opposite to a contact end is equipped with a slider, and the slider is abutted against the cam, wherein
the slider is configured to convert a rotation of the cam to a linear motion and transmit the linear motion to the clamping jaw assembly.

9. The clamp of claim 8, wherein
a material of the slider includes a rigid material, and a count of the slider is the same as a count of the at least two clamping jaws in the clamping jaw assembly.

10. The clamp of claim 3, wherein the connecting component includes a connector, one end of the connector being fixedly connected to the driving mechanism, and another end of the connector being fixedly connected to the at least two clamping jaws.

11. The clamp of claim 1, wherein a count of the at least two clamping jaws includes two, three, or four.

12. The clamp of claim 1, wherein the driving mechanism includes a linear driving mechanism.

13. The clamp of claim 12, wherein the linear driving mechanism includes a cylinder piston driving mechanism.

14. The clamp of claim 1, further comprising:
an auxiliary disengagement device, the auxiliary disengagement device including an air-jet structure disposed on the clamp; wherein
when the air-jet structure is in a usage state, the air-jet structure is connected to an inflating and deflating device.

15. The clamp of claim 1, further comprising:
an auxiliary disengagement device, the auxiliary disengagement device including a retractable push rod; wherein
the retractable push rod is disposed on the clamp.

16. The clamp of claim 1, further comprising:
an auxiliary disengagement device, the auxiliary disengagement device including a vibration device; wherein the clamp is disposed on the vibration device.

17. The clamp of claim 16, wherein the vibration device includes a micro-vibration device.

18. The clamp of claim 1, wherein
the at least two clamping jaws of the clamping jaw assembly are connected through a clamping jaw connector,
the clamping jaw connector is equipped with a clamping jaw positioning hole, and the positioning shaft is fixedly connected to the housing positioning hole and the clamping jaw positioning hole.

19. The clamp of claim 18, wherein
the clamping jaw connector of the clamping jaw assembly rotates around the positioning shaft.

20. The clamp of claim 1, wherein the driving mechanism includes at least one of a pneumatic drive, an electrical drive, or a hydraulic drive.

* * * * *